Patented Oct. 19, 1954

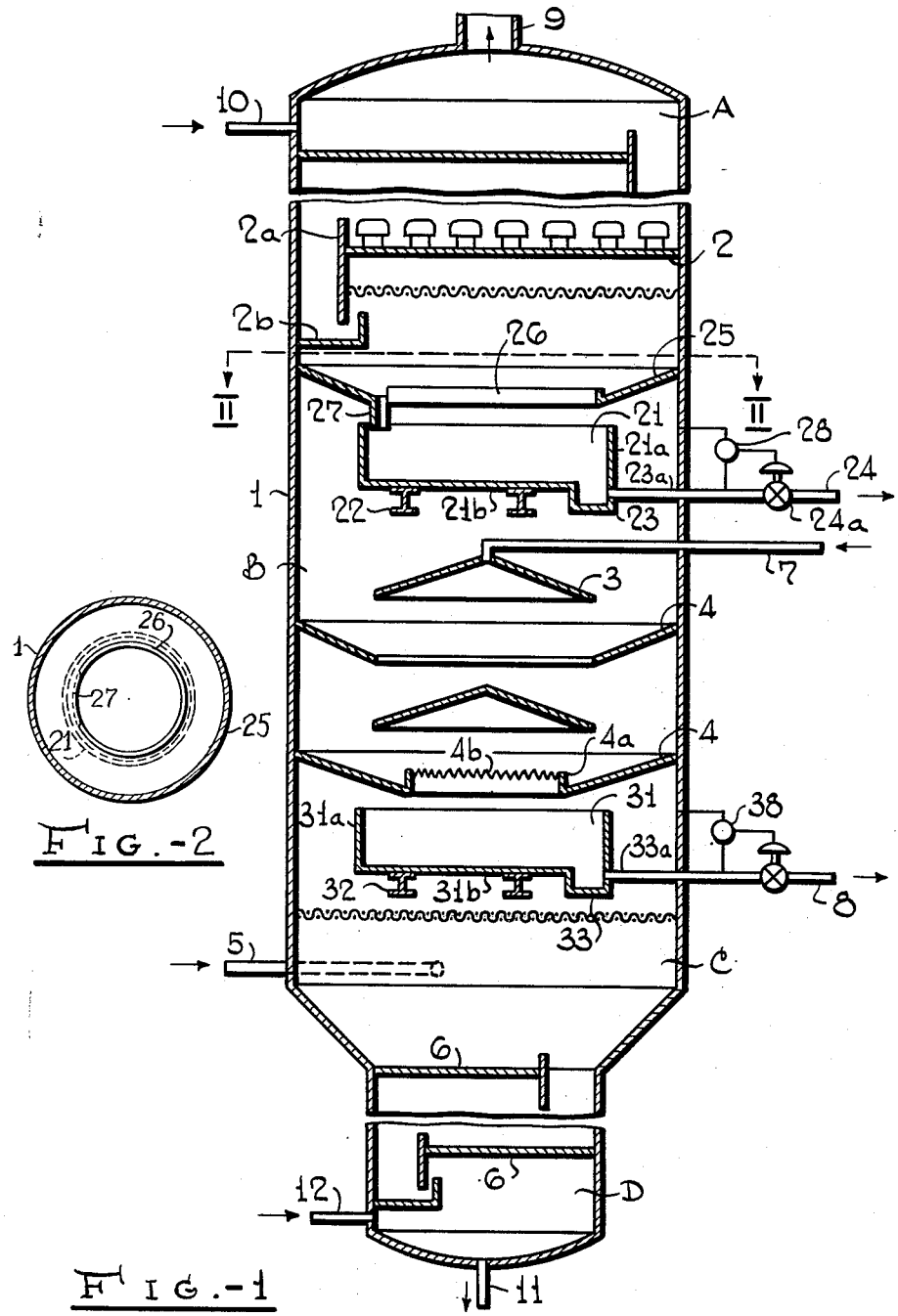

2,692,129

UNITED STATES PATENT OFFICE 2,692,129

TOTAL DRAWOFF TRAY FOR FRACTIONATING TOWERS

Charles L. Wilson and Robert E. Dineen, Billings, Mont., and George J. Bacsik, Fanwood, N. J., assignors to Standard Oil Development Company, a corporation of Delaware Application March 25, 1952, Serial No. 278,328

2 Claims. (Cl. 261—114)

The present invention relates to an improved distillation or fractionation system and particularly to such a system as employed in conjunction with a vacuum pipe still. The invention is especially concerned with an improved method and apparatus for removing an intermediate side stream from a distillation tower, according to which the side stream is withdrawn from an intermediate point in the tower in such manner that the liquid materials may be collected and withdrawn without any substantial degree of entrainment of the liquid by vaporous materials flowing upwardly through the tower. The invention is also concerned with providing a means for withdrawing an intermediate side stream, which means may be maintained in a relatively fluid-tight condition, such that leakage of the accumulated liquids into a tower section below will be substantially eliminated.

It is an object, then, to eliminate excessive leakage of the liquids accumulated for withdrawal. It is also an object of the invention to reduce entrainment of liquids in the vapors passing through the tower in the vicinity of the point of withdrawal. It is a further object of the invention to provide a structure capable of accomplishing the foregoing objects, which structure is simple in form and economical to construct and maintain. The invention and its objects may be more fully understood from the following description when read in conjunction with the accompanying drawings, in which Fig. 1 is a vertical section through a distillation or fractionation tower of the character contemplated, and Fig. 2 is a horizontal section through the tower of Fig. 1, taken along the line II—II thereof.

Referring more specifically to the drawings, the apparatus illustrated is a distillation tower served by a vacuum pipe still. The numeral 1 designates the wall of this tower. In such an installation, the tower, as shown, is divided into several sections. A condensation section in the upper portion of the tower is designated by the letter A in the drawing, and contains a vertical series of vertically spaced transverse plate elements or trays 2, by means of which liquid materials introduced into the tower above the uppermost plate are passed downwardly through the section across the plates from plate to plate. These plates are provided with conventional fractionating elements, such as bubble caps, by means of which vaporous materials passed upwardly through the tower are brought into contact with the liquid flowing downwardly and the vapors thus condensed. Weired downcomer elements 2a provide for maintenance of a liquid level on each plate and also establish a liquid seal at each plate. The downcomer element from the lowermost plate in the series, as shown, is provided with a liquid seal or trap 2b.

Immediately below the condensation section A, is a wash section B. This section, as shown, is provided with a series of vertically spaced plate elements of the disc and doughnut type. These elements are designated respectively by the numerals 3 and 4.

Below the wash section is a flash zone or section C, into which the liquid materials which have been heated to an elevated temperature are introduced by way of an inlet line 5, and below the flash zone is a stripping section D. This section, as is the condensation section, is provided with a vertical series of vertically spaced plate elements 6, and these elements are also provided with conventional fractionating and downcomer elements, as in the condensation section.

In such a tower structure, it is conventional to withdraw intermediate liquid streams at various levels in the tower. It is also required that the wash liquid introduced into the tower as by way of the line 7 be withdrawn therefrom, intermediate the wash section and the flash zone, as by way of line 8. Uncondensed vapors are withdrawn from the tower by way of line 9, and a condensing liquid material is introduced into the upper portion of the tower above the uppermost plate 2 by way of line 10. A conduit 11 is provided at the bottom of the tower below the stripping section D for withdrawal of residual liquids, and a conduit 12 opens into the stripping section substantially as shown, for the introduction of stripping steam.

The withdrawal of a liquid product material such as from the level immediately below the lowermost one of the condensation trays 2, is conventionally accomplished by means of a collection or accumulator tray, provision being made for the passage of vapors therethrough without specific contact with the accumulated liquids. In the apparatus as shown, the means provided for withdrawal of such liquid product is a receiver pan 21. This pan, as compared with the conventional accumulator plate previously referred to, is freely supported within the tower, as by means of I-beam members 22, which extend transversely in the tower and are provided to receive the pan 21, so as to permit some lateral movement thereof under expansion and contraction, but to retain the pan against any gross displacement. The receiver pan itself may be of any desired shape or form. As shown, it is a circular pan, having side and bottom wall portions 21a and 21b, respectively, and an open top. Preferably, the bottom portion of the pan 21 is also provided with a sump 23 and a drawoff line 23a opening at one end from the sump and at the other end connected to a product drawoff conduit 24. The conduit 23a is desirably provided for compensation of expansion and contraction of the line under operating conditions. Although such means is not illustrated in the drawing, it may be any such means conventionally used for the purpose indicated, including such means as a slip-fitted pipe connection or a bellows type expansion joint. Immediately above the receiver pan 21a intermediate the upper end of the pan and the lowermost tray member 2, and immediately below the liquid seal or trap 2b is provided a means for directing liquid from the lowermost tray 2 and the trap 2b into the receiver pan, while avoiding such contact with upflowing vapors as to produce entrainment of liquids thereby.

This means, as shown, is an annular baffle member 25, having a substantially inverted frusto-conical form and secured in substantially fluid-tight relationship to the tower walls along its outer peripheral edge, which forms the larger base portion of the member. The center opening of this member has a diameter somewhat smaller than the greatest dimension of the pan 21, with the inner peripheral edge portion of the member extending inwardly beyond the upper end of the pan. The baffle member 25 is preferably provided with an upstanding lip 26, substantially conformed to the opening of the baffle member and disposed along the inner peripheral edge thereof and forming, with the member, a gutter. The gutter may be broken at one or more points along its length to provide for drainage of liquids accumulated on the upper surface of the baffle members. As shown, such an opening is provided in the vicinity of and immediately below the trap or seal 2b. At this point the baffle member 25 is also provided with a dependent lip 27 extending from the inner peripheral edge of the baffle member downwardly into the pan 21 terminating below the upper edge thereof. Although, as shown, lip 27 is vertically disposed with reference to the pan and the baffle member, it may, if desired, be angularly related to either or both, extending toward the center of the pan. It may also be formed in such manner as to provide a chute in which the side edge portions have a greater curvature and extend upwardly beyond the surface of the member itself. Other means for directing and controlling flow of the liquid into the pan 21, while avoiding entrainment with upflowing vapors may be employed, if desired.

Associated with the product drawoff line 24 is a control valve 24a. This valve is intended to provide for controlled withdrawal of a product through the line 24 from the pan 21, and in the apparatus as illustrated, provision is made for such control by means such as a differential pressure controller 28 connected into the line 24 and also into the tower 1.

A means similar to that provided for accumulation and withdrawal of the liquid product delivered from the condensation section may also be employed for withdrawal of wash liquid from section B. In a vacuum distillation structure such as is described, the employment of this means at this point is of utmost importance, as any liquid material passing downwardly beyond this point is substantially unrecoverable without further and extensive treatment. The receiver pan intermediate the wash section B, and the flash zone C is designated by the numeral 31, which is comparable in all details with the pan 21 immediately below the condensation section, including a side wall portion 31a, a bottom portion 31b, and a sump 33. Likewise, the pan 31 is supported similarly to the pan 21, as by means of I-beam members 32, and the liquid drawoff means, including conduits 33a and 34, are substantially identical with their counterparts 23a and 24.

In this section of the tower, the wash liquid and any condensation products or liquids entrained by the upflowing vapors may be delivered to the receiver pan 31 from a doughnut member 4 disposed immediately above the receiver pan. If means are provided for directing liquid from the doughnut member into the receiver pan, so as to avoid such contact with upflowing vapors as will produce entrainment of the liquids thereby, in the structure as illustrated, the lowermost doughnut member 4 in the wash section is provided with an upstanding lip 4a, which forms a gutter comparable to that formed by the lip 26 on the baffle member 25. In this instance, however, the gutter or lip 4a has formed therein a plurality of spaced notches 4b, providing a substantially serrated upper edge portion for the member 4a. It is intended that these notches or serrations be arranged in such fashion that the liquid collected in the gutter will overflow through the notched or serrated portions as a plurality of separate streams which, while in contact with the vapors flowing upwardly through the tower, will not interfere with such upward flow to an extent which will result in entrainment of the liquid in such vapors. In any event, it is intended that the upper edge of the receiver pan elements 21 and 31 be spaced from the related means for delivering liquid into the pan so as to maintain a flow velocity of the vapors below that which will normally produce entrainment. The doughnut member 4, which accumulates and delivers liquid to the receiver pan 31, will have an inner diameter somewhat less than the diameter of the pan 31.

In a typical operation, an atmospheric residuum material which has been heated in a pipe still, not shown, may be introduced into the flash zone C by way of the line 5, at a temperature of approximately 850° F. The tower at this point will be at sub-atmospheric pressure, as for example a pressure of about 80–90 mm. of mercury (absolute). When so introduced, the more volatile materials are thus vaporized and pass upwardly from the flash zone C into the wash section B, while unvaporized liquids pass downwardly into and through the stripping section D into contact with stripping steam at a temperature of about 650° F., which is introduced by way of line 12. Any remaining and entrained vaporized materials are thus stripped from the liquids passing through the stripping section D and are passed upwardly into the tower sections thereabove. Unvaporized residual liquids from the bottom of the tower, and section D, are removed by way of the line 11 for delivery to storage or for recycling through the associated pipe still, not shown.

The vapors passed upwardly into wash section B may contain entrained residual liquids. These are removed by countercurrent contact with a wash liquid introduced as by line 7 onto the upper surface of the disc 3, and flowing downwardly therefrom through the tower section. This liquid is recovered by the receiver pan 31 and removed therefrom by way of line 8. The wash liquid removed by way of line 8 may be supplemented by an additional supply of wash liquid, while a certain portion of the used liquid containing residual material is withdrawn and returned to the pipe still. Such vapors as may be uncondensed in the wash section B pass upwardly around the receiver pan 21 and through the condensation section A by way of fractionating elements in the several plates 2. These vapors are thus brought into condensing contact with a condensing liquid introduced by way of the line 10 and flowing downwardly through the section A over the plates 2 in the manner previously described. The condensing liquid is preferably a vacuum gas oil having a boiling range between about 1100° F. and 1250° F. Initially, this material may be supplied from an outside source, but in normal operation it will be derived from the condensed liquid product accumulated in the receiver pan 21. In normal operation, a portion of this liquid product thus accumulated will be recycled or refluxed as withdrawn from the receiver pan 21 by way of conduits 23a and 24, and reintroduced into the tower by way of line 10. As in any conventional operation, a portion of the liquid product withdrawn from the receiver pan 21 is removed and passed to storage. Vapors remaining uncondensed after passage through the condensation section A are withdrawn from the system by way of the conduit 9.

In the apparatus as illustrated and described, the employment of a receiver pan constructed and disposed in the manner described affords a number of advantages over the conventional structure, in which a collection tray is peripherally secured in intended fluid-tight relation to the tower walls. In the structure as illustrated and described, the upflowing vapors through the wash section and the condensation section pass upwardly into each section through an annular area disposed peripherally of the liquid collection or accumulator means, without substantial increase in velocity. By suitable structural provisions for delivery of liquid material into the respective pans 21 and 31, contact of the upflowing vapors with the downflowing liquids may be readily adjusted so as to prevent substantial entrainment of liquids by the upflowing vapors.

A number of advantages may be derived from the employment of an apparatus according to the present invention, chiefly due to the fact that the liquid materials to be accumulated and removed from the tower may be so removed with a minimum amount of leakage into any section below that from which removed. In view of the substantially independent status of the receiver pans 21 and 31, these elements may be constructed with substantially fluid-tight joints. Also the assembly of such a receiver pan internally of the tower is facilitated as by welding the side portions and bottom portions 2a and 2b to each other, in situ. Inasmuch as the receiver pans 21 and 31 are supported substantially independent of either the tower walls or the supports themselves, the structural elements of the pan are able to expand and contract independently of the tower, with a consequent relief from unequal stress and strain such as normally produces leakage in a conventional structure.

The reduction of leakage, particularly in a vacuum distillation tower, decreases the possible loss of liquid products with the residual liquids withdrawn from the bottom of the tower. It also results in a reduction and loss of the material used as a wash liquid in similar fashion. Where special means may be employed for removing entrained liquids, as for example wire mesh screens, between the flash zone and the wash section, or between the wash section and the condensation section, reduction of entrainment increases the efficiency of such means and prevents excessive coking or plugging of the screens or other such means employed. The improved results caused by decreased leakage as provided by employment of the apparatus according to the present invention are especially significant in such operations as lube oil distillation, in which the mixing of lighter products with the heavier products recovered is to be avoided especially.

The apparatus substantially as described is intended for employment in any structure comparable to that which has been described, in which provision may be made for total draw-off of liquid from any portion of the apparatus with which it can be combined.

What is claimed is:

1. In an apparatus of the character described, including a tower, and a series of a vertically spaced transfer plate elements therein, over which a liquid may be passed downwardly through the tower from plate to plate, a total drawoff means for liquid, comprising a receiver pan freely supported internally of the tower below a selected plate in said series in peripherally spaced relation to the tower wall, an annular baffle member secured to the tower wall along its outer peripheral edge intermediate said selected plate element and the receiver pan, an upstanding gutter element extended peripherally of the inner edge of said baffle member, said gutter element having an arcuate outlet portion therein, and a deflector lip portion joined to the inner edge of said baffle member substantially coextensive with said gutter element outlet portion and dependent from said baffle member downwardly into said pan to terminate below the upper edge thereof.

2. An apparatus according to claim 1, including a downcomer for liquid opening downwardly from said selected plate element, in which said gutter outlet portion is disposed in downwardly and inwardly displaced alignment with said downcomer.

References Cited in the file of this patent

UNITED STATES PATENTS

| Number | Name | Date |
|---|---|---|
| 1,471,101 | Cleary | Oct. 16, 1923 |
| 2,241,674 | Mohr et al. | May 13, 1941 |
| 2,394,133 | Zimmerman | Feb. 5, 1946 |
| 2,428,922 | Shoresman | Oct. 14, 1947 |